March 24, 1959  A. H. DEWEES  2,879,078
SAFETY DEVICE FOR AUTOMOTIVE VEHICLES
Filed June 18, 1956  2 Sheets-Sheet 1

INVENTOR.
ALEXANDER H. DEWEES
BY
Barnes, Kisselle, Laughlin & Raisch
ATTORNEYS

March 24, 1959 A. H. DEWEES 2,879,078
SAFETY DEVICE FOR AUTOMOTIVE VEHICLES
Filed June 18, 1956 2 Sheets-Sheet 2

INVENTOR.
ALEXANDER H. DEWEES
BY
ATTORNEYS

United States Patent Office 2,879,078
Patented Mar. 24, 1959

2,879,078
SAFETY DEVICE FOR AUTOMOTIVE VEHICLES

Alexander H. Dewees, Detroit, Mich.

Application June 18, 1956, Serial No. 591,905

4 Claims. (Cl. 280—150)

This invention relates to a safety device for automotive vehicles and has to do with a device which can be mounted in an automotive vehicle with practically no structural changes in the present automobile body construction.

The invention aims to provide, in a single structure, a safety element which can be called a safety belt, in that it embraces the lower portion of the torso of a person sitting in a seat, and an element which embraces the shoulders of a person sitting in said seat, to thereby restrain the upper portion of the body from being projected forwardly incident to impact. The safety device providing these two elements is constructed as a single unit and may be conveniently anchored to the automobile structure at a single location preferably at the location of the floor. A further feature of the invention is to provide for supporting the head of a passenger in an automobile incident to rebound forces following sudden stoppage or impact.

The accompanying drawings demonstrate the invention and in these drawings.

Figure 1:
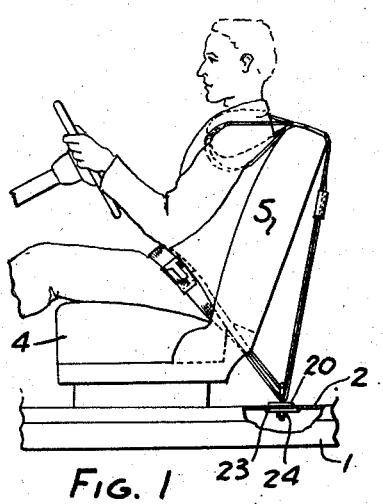
Fig. 1 is a view illustrating a safety device applied and in use.

As illustrated in Fig. 1, structural elements, such as the frame of an automotive vehicle as shown at 1, and the portion 2 may be the floor of the car or a strong structural part thereof indicated at floor level or underneath floor level. The seat for the driver is illustrated at 4 and the back of the seat at 5. The person indicated is in the driver's seat but obviously the safety device can be applied to other passengers.

Figure 2:
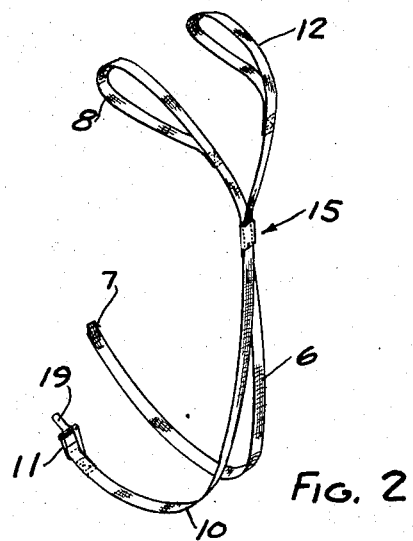
Fig. 2 is a view illustrating the device.
Figure 4:
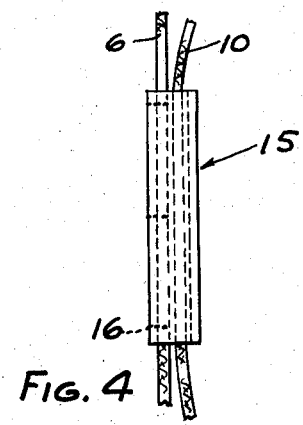
Fig. 4 is a view of a loop for interengaging safety elements where the elements cross each other.

One form of safety device is shown in Fig. 2. There is a length or strap of strong material 6 advantageously of woven form having adequate tensile strength. One end is shown at 7; the opposite end is formed into a loop 8. Another length or strap of material is illustrated at 10 having a buckle 11 at one end and a loop 12 at the opposite end. The two straps or lengths of material are preferably associated with each other by a loop 15. This is preferably of a material similar to that of which the straps are made. It is fashioned into a loop and is preferably stitched to one of the straps. As shown in Fig. 4 the loop 15 is stitched as at 16 to the strap 6. The loop provides adequate space for the strap 10 to slidably pass therethrough.

Figure 3:
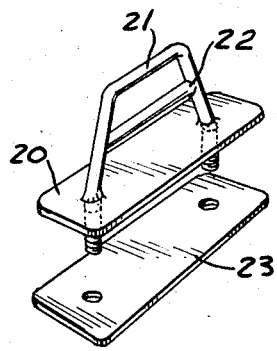
Fig. 3 is a separated view of an anchoring device.
Figure 5:
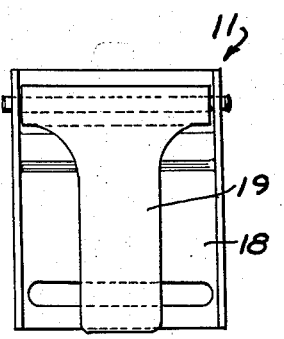
Fig. 5 is a view of a buckle.
Figure 6:
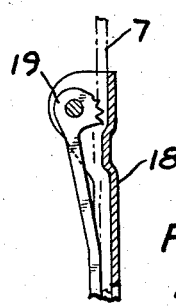
Fig. 6 is a sectional view of the buckle.

The buckle 11 may be of any suitable type and is indicated in Figs. 5 and 6 as having a body 18 and a pivotally mounted clamp member 19 for engaging a strap which is passed between the body 18 and pivoted member 19 as shown in Fig. 6. The anchor for such a safety device may be of the type as shown in Fig. 3. This device has a plate 20 with a staple like device or loop member secured thereto having a cross bar 21 and a second cross bar 22. The ends of the staple or loop are threaded as shown, and to mount the anchor all that is needed is two holes in the floor or structural part of the vehicle for the threaded ends of the staple to pass therethrough. A plate 23 may be disposed underneath the floor or structural element and the mounting is completed by means of nuts 24.

The straps 6 and 10 respectively are inserted under the cross bars 21 and 22. Thus the straps do not friction on each other and individual straps are free to shift lengthwise in the anchor.

The device is applied as illustrated in Fig. 1. The straps extend upwardly from the anchor to the rear of the back of the seat and the looped ends are passed over the top of the seat back. The opposite ends are positioned angularly and passed over the lower portion of the torso with the end 7 passed through and buckled to the buckle 12. The person applies the loops by passing one arm through the loop 12 and another through the loop 8.

The adjustment of the buckle permits not only of the adjusting of the tightness of the seat belt element but also adjusts the application of the loops 8 and 12 to the shoulders. The loops 8 and 12 preferably pass about under the arm pits. The adjustment should be made so that normally there is no binding of the occupant, but to the contrary, so that there is ample looseness for normal movement but, on the other hand, sufficiently snug to prevent the occupant from being thrown forward. All forces incident to impact or sudden stoppage of the vehicle are delivered to the anchor which is secured to a strong part of the vehicle. The back of the seat 5 functions somewhat as a strut and the tautness of the straps from the anchor to the top of the seat back holds the back of the seat from being thrown forwardly. The loose tube or sleeve 15 provides for relative movement of the straps so that the shoulder straps may be adjusted as desired.

Figure 7:
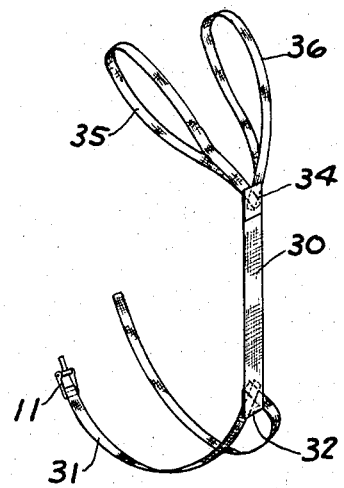
Fig. 7 is a view of a modified form of safety device.
Figure 8:
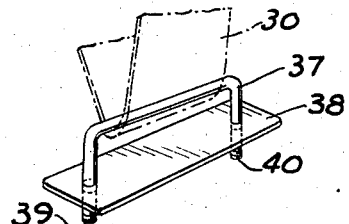
Fig. 8 is a view of modified form of the anchor.

A modified form is shown in Fig. 7, where there is a single body strap 30 with a seat belt 31 passing through a loop 32. One end of the seat belt 31 is provided with the buckle 11. Secured to the opposite end of the body strap as at 34 are two shoulder loops 35 and 36. This form is anchored to the vehicle structure and used in the same manner as is the form shown in Fig. 2. However, a simple anchoring U-shape bolt or staple 37 may be used since only the body strap 30 need be passed therethrough. This anchor may have a plate 38 and threaded ends 39 and 40 for receiving nuts, like those shown in Fig. 1.

Figure 9:
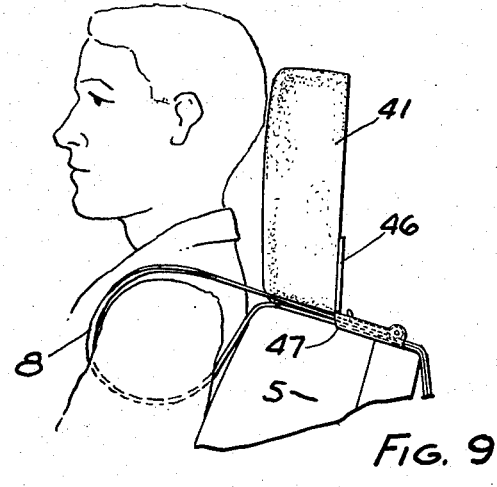
Fig. 9 is a view in the form of the invention which embodies an element to protect the head incident to rebound forces.
Figure 10:
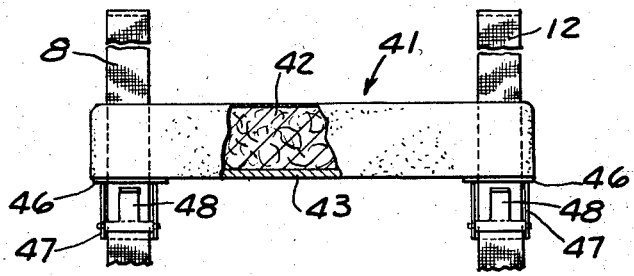
Fig. 10 is a plan view of the safety device of Fig. 9 with some parts cut away.

A further modified arrangement is shown in Figs. 9 and 10 and this may be used with the form of safety device, shown in Fig. 2 and with the form shown in Fig. 7. There is a form of head rest generally shown at 41 preferably padded or cushioned as at 42, and it may have a stiff back wall 43. It is shown mounted on the loops 8 and 12 of the form shown in Fig. 2. Secured to the back portion 43, as by means of a plate 46 is a buckle 47. This buckle may be of the same type as shown in Fig. 5 having a lever 48. There is a buckle for the loops 8 and 12. Since they are the same only one is described. The loop 8 and the loop 12, or at least one run thereof, is passed through the respective buckles and held clamped thereto by the fastening of the clamping levers 48. In this way, the position of the head rest may be adjusted in a fore and aft direction to thus accommodate different individuals.

This device functions to check the rebound of the head of the occupant following collision, sudden stoppage or impact. When the vehicle stops quickly for any reason, the shoulder straps and seat belt hold the occupant in the seat. However, the head of the person represents considerable weight and due to inertia the head is thrown forwardly. With the body held against forward movement the reaction imposes strong forces which snaps the head of an occupant back after it has been thrown forwardly and thus there is a possibility of injury to the neck. With this device when the head is thrown backwardly it is engaged and decelerated or stopped by the cushioned head rest.

I claim:

1. A safety device for an occupant of a seat of a vehicle, the seat having a seat proper and a back, and the vehicle having a structural part or floor part to the rear of the seat comprising, an anchor adapted to be secured to said structural part, two straps each slidably connected to the anchor, and adapted to extend upwardly therefrom behind the seat back, and to be passed over the top of the seat back, each strap having a loop for the passage of arms of an occupant therethrough, whereby to engage the occupant adjacent the shoulders, the other ends of the straps adapted to be passed forwardly and around the lower portion of the torso of the occupant, and a buckle on one of said ends for adjustably receiving the said other end, whereby adjustment of the buckle adjusts the straps over the lower portion of the torso and the said loops.

2. The safety device as recited in claim 1 characterized in that the anchor has two parts, one for slidably receiving one strap and one for slidably receiving the other strap.

3. The safety device as recited in claim 1 characterized in that there is a loop attached to one of the straps and positioned so that it lies behind the seat back, and the other strap slidably passes through said loop with said loop holding said straps in crossing relationship.

4. A safety device for an occupant of a seat of a vehicle, the seat having a seat proper and a back, and the vehicle having a structural part or floor part to the rear of the seat comprising, an anchor member adapted to be secured to said structural parts, strap means adapted to extend upwardly from the anchor behind the seat back and to be passed over the top of the seat back and provided with closed terminal loops for engaging the occupant adjacent the shoulders, said strap means having other parts extending from the anchor and adapted to be passed over the lower portion of the torso of an occupant of said seat and buckle means for adjustably connecting the last named other parts, a cushioned head support, attaching means for adjustably connecting the head support to the portions of the strap means which extend across the top of the seat back, so that the head support extends upwardly from the top of the seat back and is in a position to engage and support the head of the occupant incident to forces tending to throw the head backwardly.

References Cited in the file of this patent

UNITED STATES PATENTS

| 1,050,874 | Twombly | Jan. 21, 1913 |
| 1,898,090 | Lethern | Feb. 21, 1933 |
| 2,475,588 | Bierman | July 12, 1949 |
| 2,576,867 | Wilson | Nov. 27, 1951 |
| 2,758,769 | Nunn et al. | Aug. 14, 1956 |
| 2,771,128 | Doolittle | Nov. 20, 1956 |

FOREIGN PATENTS

| 144,067 | Sweden | Feb. 9, 1954 |